US012574094B2

(12) United States Patent　　　　　(10) Patent No.:　US 12,574,094 B2
Thomas et al.　　　　　　　　　　　(45) Date of Patent:　　Mar. 10, 2026

(54) BEAM SELECTION USING A BEAM FINGERPRINTING DATABASE

(71) Applicant: Lenovo (Singapore) Pte. Ltd., New Tech Park (SG)

(72) Inventors: Robin Thomas, Bad Nauheim (DE); Sher Ali Cheema, Ilmenau (DE); Ankit Bhamri, Rödermark (DE); Ali Ramadan Ali, Kraiburg am Inn (DE); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 236 days.

(21) Appl. No.: 18/258,146

(22) PCT Filed: Dec. 16, 2021

(86) PCT No.: PCT/IB2021/061873
§ 371 (c)(1),
(2) Date: Jun. 16, 2023

(87) PCT Pub. No.: WO2022/130289
PCT Pub. Date: Jun. 23, 2022

(65) Prior Publication Data
US 2024/0072870 A1　　Feb. 29, 2024

Related U.S. Application Data

(60) Provisional application No. 63/126,424, filed on Dec. 16, 2020.

(51) Int. Cl.
*H04B 7/06*　　　　(2006.01)
*H04B 7/08*　　　　(2006.01)
(Continued)

(52) U.S. Cl.
CPC ......... *H04B 7/06952* (2023.05); *H04B 7/088* (2013.01); *H04B 17/318* (2015.01); *H04B 17/364* (2015.01); *H04W 64/003* (2013.01)

(58) Field of Classification Search
None
See application file for complete search history.

(56) References Cited

U.S. PATENT DOCUMENTS

| | | | |
|---|---|---|---|
| 2019/0097712 A1 | 3/2019 | Singh et al. | |
| 2021/0152990 A1* | 5/2021 | Pajovic | ................ G01S 5/0226 |
| 2022/0321192 A1* | 10/2022 | Katla | .................... G06N 3/048 |

OTHER PUBLICATIONS

PCT/IB2021/061873, "Notification of Transmittal of the International Search Report and the Written Opinion of the International Searching Authority, or the Declaration", International Searching Authority, Apr. 5, 2022, pp. 1-13.

(Continued)

*Primary Examiner* — Minh Trang T Nguyen
(74) *Attorney, Agent, or Firm* — Kunzler Needham & Hilton

(57) ABSTRACT

Apparatuses, methods, and systems are disclosed for location-aware beam selection. One method a communication device (i.e., a UE and/or gNB) includes mapping a set of beam signal characteristics to UE location information and storing said mapping to a Beam Fingerprint ("BFP") database. The method includes identifying a UE location and selecting an optimal beam based using the UE location and the BFP database, said optimal beam being one of: a transmit beam and a receive beam.

20 Claims, 9 Drawing Sheets

(51) Int. Cl.
     *H04B 17/318*          (2015.01)
     *H04B 17/364*          (2015.01)
     *H04W 64/00*           (2009.01)

(56)                    References Cited

OTHER PUBLICATIONS

Deng et al., "Channel Fingerprint Based Beam Tracking for Millimeter Wave Communications", IEEE arXiv:1912.11578v1 [cs.IT], Dec. 25, 2019, pp. 1-5.

Li et al., "Beam Management in Millimeter-wave Communications for 5G and Beyond", IEEE DOI 10.1109/ACCESS.2019.2963514, Dec. 29, 2019, pp. 1-12.

Rezaie et al., "A Deep Learning Approach to Location- and Orientation-aided 3D Beam Selection for mmWave Communications", IEEE arXiv:2110.06859v1 [eess.SP], Oct. 13, 2021, pp. 1-30.

Satyanarayana et al., "Deep Learning Aided Fingerprint Based Beam Alignment for mmWave Vehicular Communication", IEEE Transactions on Vehicular Technology, vol. XX, No. XX, XXX, 2019, pp. 1-14.

3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.5.0, Sep. 2020, pp. 1-434.

3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.5.0, Sep. 2020, pp. 1-181.

3GPP, "3rd Generation Partnership Project; Technical Specification Group Radio Access Network; NR; Requirements for support of radio resource management (Release 16)", 3GPP TS 38.133 V16.5.0, Sep. 2020, pp. 1-1608.

3GPP, "3rd Generation Partnership Project; Technical Specification Group Radio Access Network; NR; Physical channels and modulation (Release 16)", 3GPP TS 38.211 V16.3.0, Sep. 2020, pp. 1-133.

3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.

3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.

3GPP, "3rd Generation Partnership Project; Technical Specification Group Radio Access Network; NR; User Equipment (UE) radio access capabilities (Release 16)", 3GPP TS 38.306 V16.2.0, Sep. 2020, pp. 1-126.

3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

Va et al., "Inverse Multipath Fingerprinting for Millimeter Wave V2I Beam Alignment", IEEE arXiv:1705.05942v3 [cs.IT], Sep. 17, 2017, pp. 1-16.

* cited by examiner

900

Start

905 — Map a set of beam signal characteristics to UE location information

910 — Store the mapping to a BFP database

915 — Identify a UE location

915 — Select an optimal beam based using the UE location and the BFP database, said optimal beam being one of: a transmit beam and a receive beam End

BEAM SELECTION USING A BEAM FINGERPRINTING DATABASE

CROSS-REFERENCE TO RELATED APPLICATIONS

This application claims priority to U.S. Provisional Patent Application No. 63/126,424 entitled "BEAM MANAGEMENT ENHANCEMENTS USING FINGERPRINTING" and filed on Dec. 16, 2020 for Robin Thomas, Ankit Bhamri, Sher Ali Cheema, Ali Ramadan Ali, and Karthikeyan Ganesan, which application is incorporated herein by reference.

FIELD

The subject matter disclosed herein relates generally to wireless communications and more particularly relates to enhancing beam management by using beam fingerprinting to select an optimal transmit and/or receive beam.

BACKGROUND

In certain wireless networks, beam-based communication may be supported. Third Generation Partnership Project ("3GPP") New Radio ("NR") beam-management procedures defined in Releases 15 and 16 ("Rel-15/16") include initial beam acquisition, beam training, beam refinement and beam failure recovery rely heavily on constant/periodic exchange of reference signals and corresponding measurement reporting between the network and User Equipment ("UE") for control and/or data channel transmissions in both uplink ("UL") and downlink ("DL") directions.

BRIEF SUMMARY

Disclosed are procedures for enhancing beam management by using beam fingerprinting to select an optimal transmit and/or receive beam. Said procedures may be implemented by apparatus, systems, methods, or computer program products.

One method of a communication device for location-aware beam selection includes mapping a set of beam signal characteristics to User Equipment ("UE") location information and storing said mapping to a Beam Fingerprint ("BFP") database. The method includes identifying a UE location and selecting an optimal beam based using the UE location and the BFP database, said optimal beam being one of: a transmit beam and a receive beam. In one embodiment, the communication device is a UE. In another embodiment, the communication device is a Radio Access Network ("RAN") node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
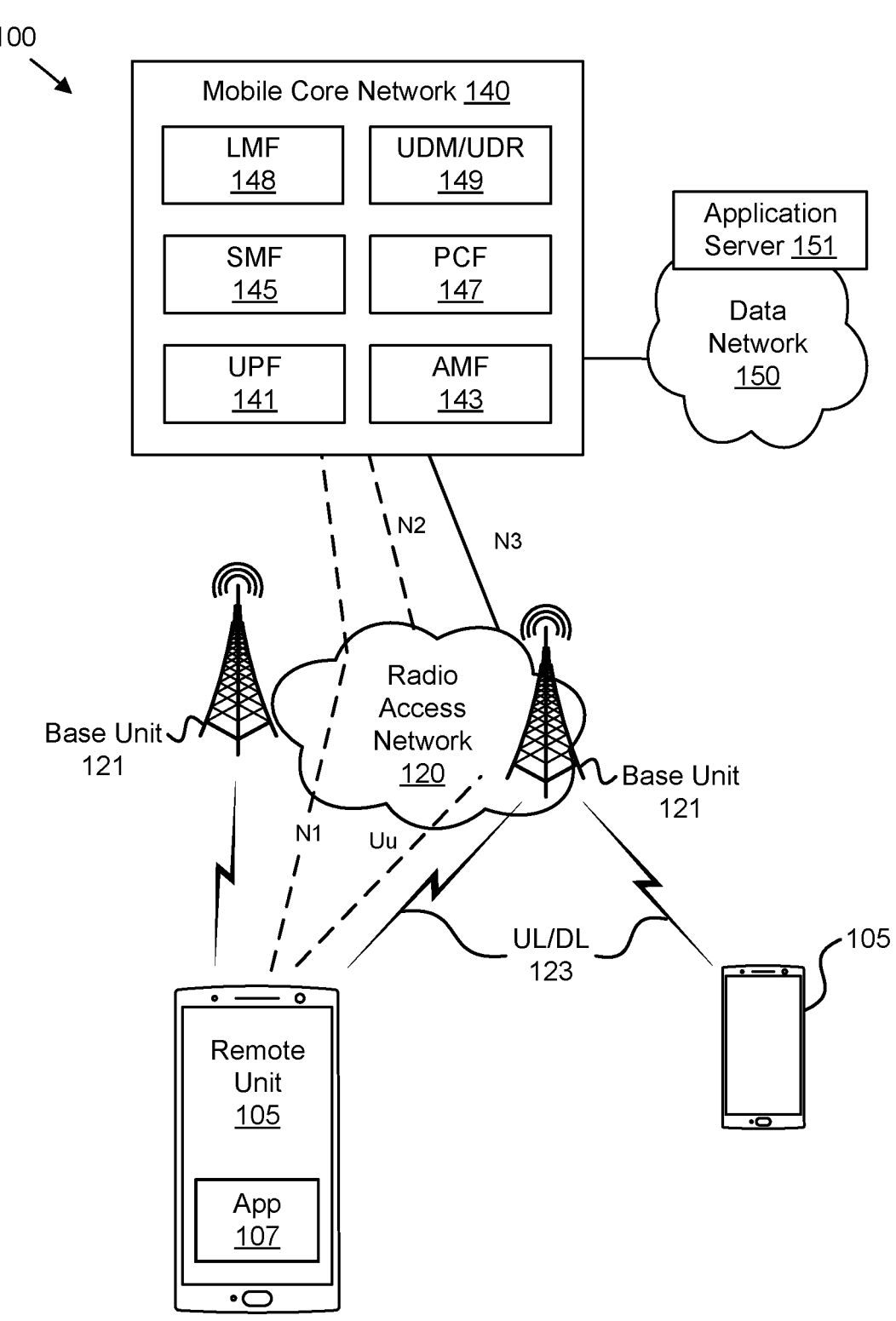
FIG. 1 is a schematic block diagram illustrating one embodiment of a wireless communication system for location-aware beam selection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for enhancing beam management by using beam fingerprinting to select an optimal transmit and/or receive beam. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

NR Rel-15/16 beam-management procedures—including initial beam acquisition, beam training, beam refinement, and beam failure recovery—rely heavily on constant/periodic exchange of reference signals and corresponding measurement reporting between the network and UE for control/data channel transmissions in both UL and DL directions. In certain stringent and dynamic use cases, e.g., Industrial Internet of Things ("IIoT") scenarios, the existing beam-management procedures may incur overhead and delays. Further beam-management issues are escalated due to blockages (static and/or mobile) in the higher frequency range.

Consequently, the latency and overhead involved for such procedures is quite high. Moreover, the issues are expected to be further escalated for higher frequency ranges where the beams would be required to be very narrow in order to serve different use cases.

To resolve the above-mentioned beam-management issues, various solutions are disclosed based on location-aware beam-management. Currently, no mechanism and/or signaling exists in the NR to facilitate beam acquisition, beam indication, beam training, beam refinement based on location of the UE with respect to one or multiple Transmit/Receive Points ("TRPs"). The present disclosure aims to design a signaling framework that can address the requirements of enabling location-aware beam-management procedures.

Disclosed are solutions that provide an NR framework for reducing overhead and latency signaling for beam management using a beam fingerprint database. Configuration and signaling options are provided in the below solutions for updating the beam fingerprint ("BFP") database based on a set of predetermined criteria. The content of the beam fingerprint database is defined herein with respect to the UE location information and beam signal characteristics.

Procedures for initiating beam training using the BFP database in NR including beam selection and correspondence are described in the below solutions. This includes procedures for location information acquisition using Radio Access Technology ("RAT")-dependent and RAT-independent positioning techniques. BFP procedures for beam maintenance and beam failure are also described herein.

RF fingerprinting ("RF FP") is a type of positioning that relies on the mapping the UE's measured RF signal characteristics of the radio environment, including aspects such as received signal strength, time delay parameters, multipath, Non-Line-of-Sight ("NLOS") blockages in various scenarios, e.g., indoor or outdoor settings, using classification based on these unique signal signatures associated with a specific location, which is then stored in database. It is further known that such a database mapping does not require additional signal processing when compared to timing-based and angular-based positioning methods with a high applicability in indoor environments and has been extensively investigated especially in the context of wireless communication technologies such as Wi-Fi®, BLUETOOTH® Low Energy ("BLE"), etc.

There can exist two phases when performing RF Fingerprinting to localize UEs: A) Offline phase and B) Online phase. For the Offline (calibration) phase for RF FP, the RF signal features are empirically obtained, and each measurement is associated with a corresponding location information. These predefined data points are then stored in database to create a so-called RF radio map of the target area. For the Online phase, the UE's real time measurements of the aforementioned RF signal features are compared with data stored during the offline phase to determine the UE's location.

As used herein, a beam is usually referred to as an absolute beam for a given location/coordinates and that is applicable regardless of the UE in that location, wherein the beam would entail at least the Angle-of-Arrival ("AoA") of a receive ("Rx") beam, Angle-of-Departure ("AoD") for a transmit ("Tx") beam, orientation with respect to a fixed reference, elevation of beam. In case, if beam means something different such as a relative beam for a given UE such as indicated by Quasi-Co-Location ("QCL") Type-D assumption, then it will be explicitly mentioned.

Beam-management signaling procedures can be enhanced through the network being more aware of the UE's location at a given time. In controlled and limited geographic environment, beam signal characteristics can be associated with location-dependent features and serve as data points as part of a centralized/distributed database. Contrary to the Fingerprinting positioning technique where such a database would serve to localize a UE, the inverse fingerprinting technique aims to optimize the beam management procedures using a beam map that can be configured with local beam maps depending on their location information.

FIG. 1 depicts a wireless communication system 100 for location-aware beam selection, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more downlink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In the depicted embodiment, the mobile core network 140 includes a Location Management Function ("LMF") 148 which supports various 5G positioning techniques. The LMF 148 receives measurements and assistance information from the RAN 120 and the remote unit 105 via the AMF 143 to compute the position of the UE. In some embodiments, the system 100 supports the NR Positioning Protocol A ("NRPPa") protocol to provide positioning information to the LMF 148. In some embodiments, the LMF 148 may configure the remote unit 105 using the LTE positioning protocol ("LPP") via the AMF 143.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for location-aware beam selection apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions are also equally applicable to other mobile communication systems for location-aware beam selection.

Beam-management signaling procedures can be enhanced through the network being more aware of the UE's location at a given time. In controlled and limited geographic environment, beam signal characteristics can be associated with location-dependent features and serve as data points as part of a centralized/distributed database. The inverse fingerprinting technique aims to optimize the beam management procedures using a beam map to select an optimal beam for communication based on the known location of the UE. In one embodiment, a communication device, such as the gNB and/or UE, may be configured with local beam maps depending on their location.

The following solutions present an NR beam management framework based on absolute position of devices and/or relative position of devices with respect to one or multiple TRPs and/or other devices in the region. The solutions include the following key aspects: 1) Association between set of best beams from one or multiple TRPs and the location of devices to create beam fingerprint database at the gNB (one or multiple TRPs); 2) Initial configuration/indication of partial or complete BFP database from the network to UE(s); 3) UE procedures based on the indicated/configured BFP database; and 4) Update of BFP database based on training.

The association between a set of best beams from one or multiple TRPs and the location of devices is used to create a BFP database (also referred to as an inverse beam finger-print database) at the gNB (one or multiple TRPs). The data collection and database generation with corresponding trig-gering and signal messaging related to the initial phase of the BFP database procedure that would be also used to create the RF radio beam map.

Manual and automated database setup of the BFP param-eters based on the UE's location information, which occurs in a phase prior to the beam-management procedures. The collection of the different beam-based signal features cor-responding to the UE location information within a prede-termined location area. This includes aspects such as the BFP content and the type of signaling associated with a location point. The below described beam association meth-ods enable offline training to generate the BFP database.

Initially, the UE(s) may be configured with (or indicated) a BFP database (e.g., partial or complete) from the network (e.g., gNB). A partial BFP database may be signaled as part of the initial access procedure to the UE, e.g., by coarsely identifying the location of UE based on the Synchronization Signal Block ("SSB") beams. Thereafter, the UE in the connected state may receive finer and/or periodic updates of the BFP database from the network.

Once the UE is indicated/configured with the database, it is expected that the UE can autonomously update its Rx/Tx beam selection depending upon its location, orientation, mobility. As discussed in greater detail below, the UE updates the BFP database based on different criteria.

Additionally, the network (e.g., gNB) is capable of con-stantly updating the BFP database based on receptions from the UEs that it has served. Coordination and management of network entities storing and updating the BFP. As discussed in greater detail below, the network may also update the BFP database based on different criteria.

From a network perspective, a key benefit of selecting an optimal beam using inverse beam fingerprinting includes the reduction of beam-management related signaling overhead especially in controlled and predictable environments, such as IIoT/indoor factory settings. This would allow for seam-less beam alignment between the UE and gNB as it will avoid the need for excessive beam sweeping and signaling exchange in the event that blockages occur, or the radio environment dynamically changes. This is especially ben-eficial in high frequency scenarios where the number of beams is large.

From the UE perspective, another key benefit is the reduction in physical layer latency of acquiring or switching to another beam depending on its location information characteristics such as two-dimensional and/or three-dimen-sional ("2D/3D") positioning, speed/velocity, heading, etc. by, for example, preparing the proper beam in advance before entering a certain area/position considering the speed and the heading information.

Figure 2:
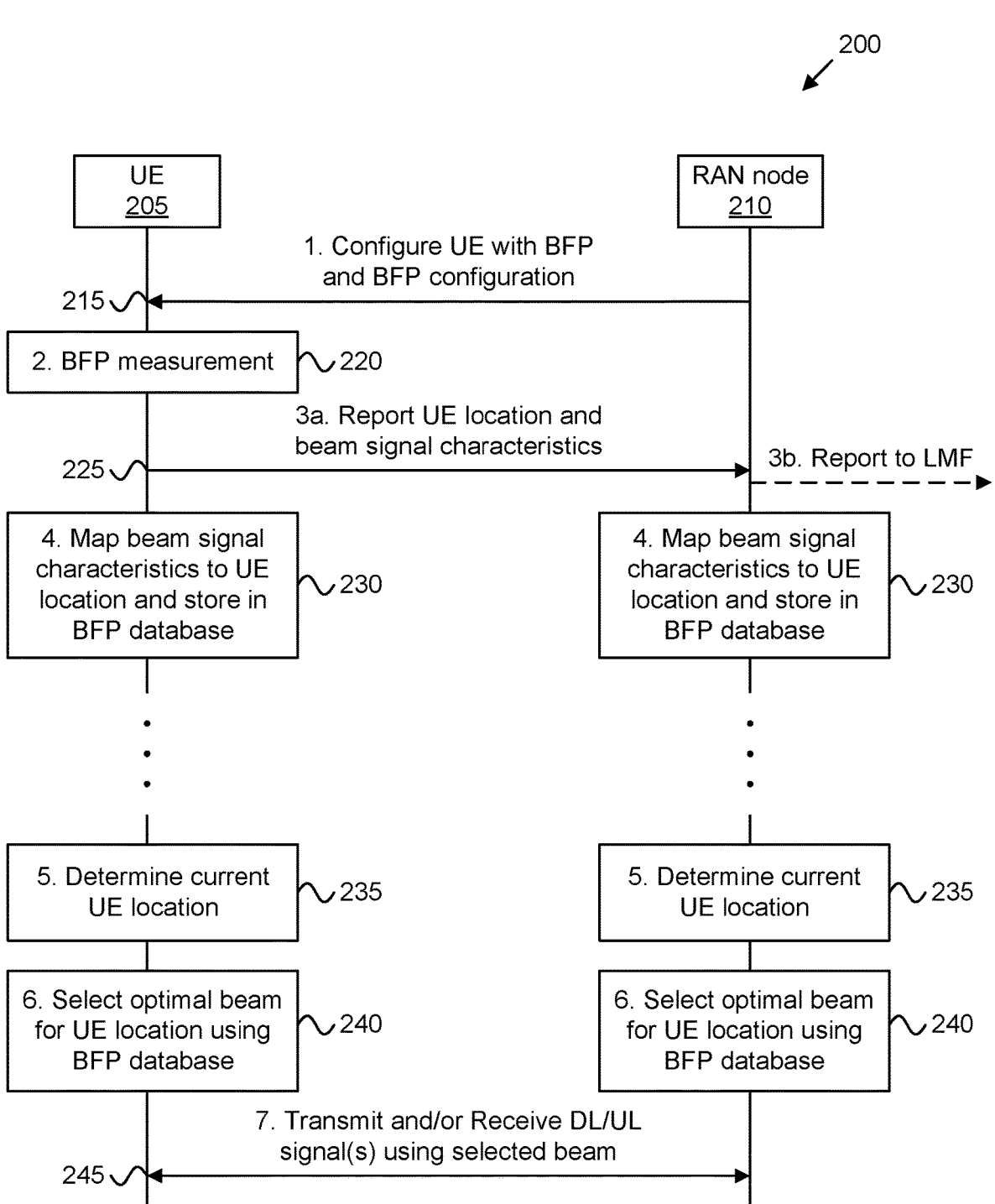
FIG. 2 is a state diagram illustrating one embodiment of a procedure for location-aware beam selection.

FIG. 2 is a diagram illustrating an exemplary procedure 200 for location-aware beam selection, according to embodiments of the disclosure. The procedure 200 involves a UE 205 and a RAN node 210. The UE 205 may be one embodiment of the remote unit 105, while the RAN node 210 may be one embodiment of the base unit 121.

At Step 1, the RAN node 210 configures the UE 205 with a RF Beam Fingerprint ("BFP") database and a configura-tion for data collection and update of the BFP database (see messaging 215).

At Step 2, the UE 205 performs BFP measurement(s) according to the received configuration, i.e., by measuring and logging beam signal characteristics (see block 220). Said beam signal characteristics may include Synchroniza-tion Signal Reference Signal Received Power ("SS-RSRP"), Synchronization Signal Reference Signal Received Quality ("SS-RSRQ"), Channel State Information Reference Signal Received Power ("CSI-RSRP"), Channel State Information Reference Signal Received Quality ("CSI-RSRQ"), AoD/AoA measurements, timing-based measurements, power delay profile measurements, in addition to any QCL assump-tions associated to the beams.

At Step 3a, the UE 205 reports its location and the measured/logged beam signal characteristics to the RAN node 210 (see messaging 225). In one embodiment, the UE 205 is configured to log its BFP measurements and report its logs to the RAN node 210 in response to a trigger condition, e.g., expiry of a timer. In another embodiment, the UE 205 is configured to immediately report its BFP measurements.

Similarly, the UE 205 may be configured to report its location in aperiodic, semi-persistent or periodic manner using Radio Resource Control ("RRC") signaling, Media Access Control ("MAC") Control Element ("CE"), and/or LPP signaling. In one embodiment, the UE location may be one or more of the following: Zone ID/Grid ID, 2D (x,y) coordinates of the UE, 3D (x,y,z) coordinates of the UE, UE Speed/velocity, Orientation, Heading, Height, Antenna array location information, or combinations thereof.

At optional Step 3b, the RAN node 210 reports the UE location and the beam signal characteristics to a core net-work function, such as LMF, that maintains a centralized BFP database.

At Step 4, the UE 205 and the RAN node 210 map the beam signal characteristics to the UE location and store the mapping in the BFP database (see block 230).

Note that Steps 1-4 comprise a training phase of the BFP database.

At Step 5, at another time the UE 205 and/or RAN node 210 utilize the BFP database to select an optimal beam for RF communication. Accordingly, the UE 205 and/or the RAN node 210 determine the current UE location (see block 235).

At Step 6, the UE 205 and/or RAN node 210 select an optimal beam for the current UE location using BFP data-base, e.g., by using the current UE location to lookup a set of beam characteristics and selecting the optimal beam based on the stored beam characteristics, thereby performing inverse beam fingerprinting (see block 240).

At Step 7, the UE 205 and/or RAN node 210 communi-cate using the selected beam(s) (see messaging 245). In one embodiment, the UE 205 selects an optimal receive beam and uses the selected beam to receive a DL signal from the RAN node 210. In another embodiment, the UE 205 selects an optimal transmit beam and uses the selected beam to transmit a UL signal to the RAN node 210. In one embodiment, the RAN node 210 selects an optimal transmit beam and uses the selected beam to transmit a DL signal to the UE 205. In another embodiment, the RAN node 210 selects an optimal receive beam and uses the selected beam to receive a UL signal from the UE 205.

Disclosed herein is a first solution, directed to establishing an RF Beam Fingerprint ("BFP") Database. The first solution comprises three main aspects: RF BFP data collection and update, RF BFP database generation, and Multi-level RF BFP database generation.

Regarding RF BFP data collection and update, in order to enhance the beam-management procedures based on the RF BFP database, the network (i.e., the gNB) must be able to initially request or determine a UE's location in order to map it to the RF fingerprint database. Prior to that step, the RF BFP database must be readily available for access by the RAN node, e.g., gNB, or UE, or—in another implementation—the Core Network ("CN") node (e.g., LMF 148). In the case that the RF FP database is unavailable, provision should be made to dynamically generate the RF FP database.

Figure 3:
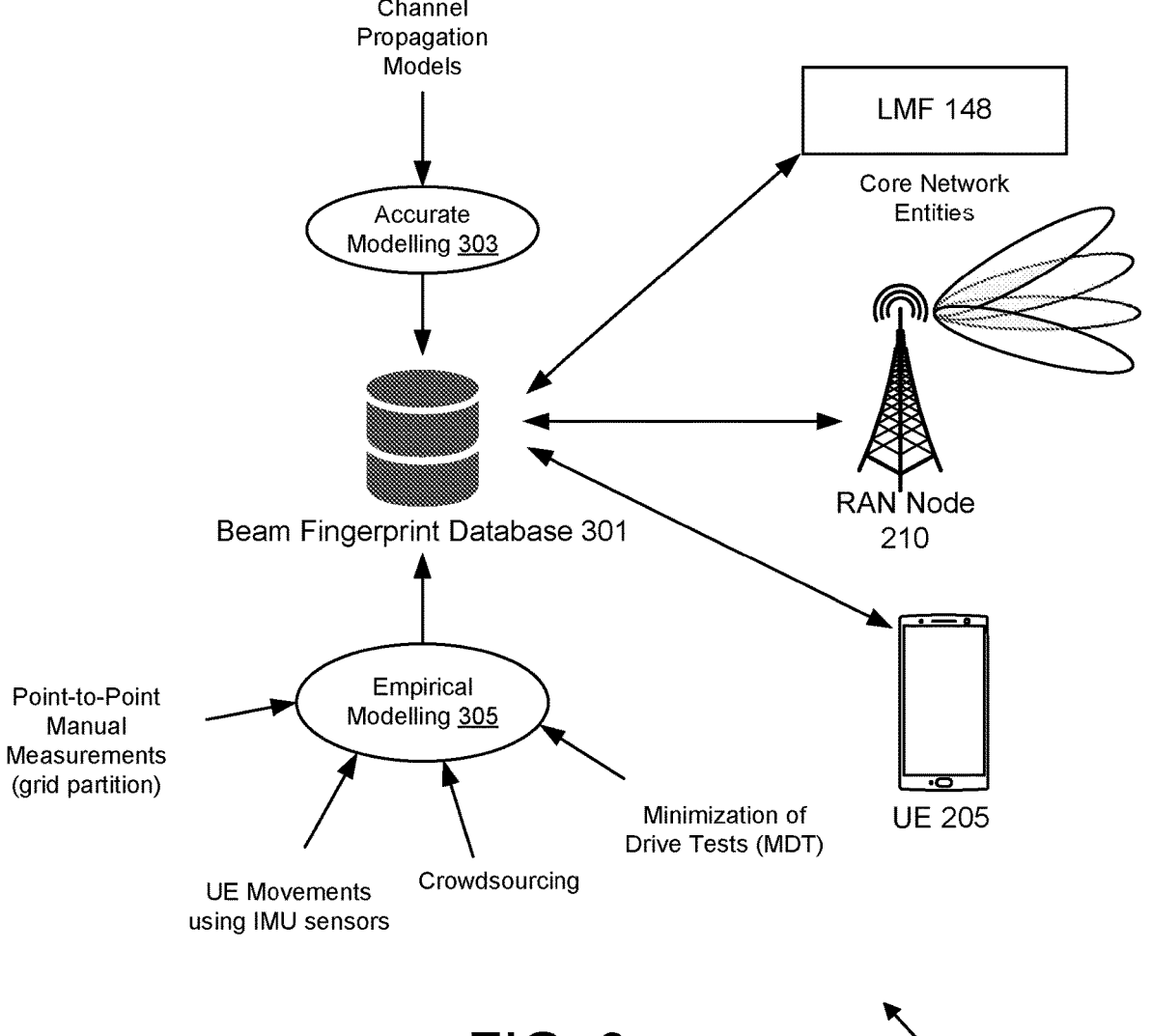
FIG. 3 is a diagram illustrating one embodiment of radio frequency beam fingerprint database generation.

FIG. 3 depicts various interactions 300 for generating an RF BFP database 301, according to embodiments of the disclosure. A number of different methods exist to collect sufficient RF Signal Features-to-UE location data points that can be viewed in FIG. 3. This set of procedures may be also referred to as the offline training phase in order to collect RF BFP data to setup the database. As discussed above, the RF BFP database 301 is to be readily available for access by the UE RAN node 210, the UE 205, and/or core network entities, such as the LMF 148. The UE 205 may also initially store and update the BFP database during the offline phase and transmit this database aperiodically or periodically to the RAN node 210 and/or LMF 148.

In one implementation, there may be a centralized database of BFP data for all gNBs within the area of interest. In one embodiment, the LMF 148 maintains a central RF BFP database 301. In an alternate implementation, a distributed RF BFP database 301 may be employed at each RAN node 210 containing the BFP data of all TRPs specific to each RAN node 210. Still further, each RAN node 210 may include a local copy of the BFP data, for example storing a subset of the centralized database.

The RF BFP database 301 may be generated using various types of modelling, including empirical modelling 303 and accurate modelling 305. Empirical modelling 303 makes use of data samples consisting of received beam signal strength measurements, e.g., SS-RSRP, SS-RSRQ, CSI-RSRP, CSI-RSRQ. Sources of data samples for empirical modelling 303 include, but are not limited to, Point-to-Point ("P2P") manual measurements (e.g., using grid partitions), movement of the UE 205 tracked using Inertial Measurement Unit ("IMU") sensors, crowdsourcing, and Minimization of Drive Tests ("MDT").

Accurate modelling 305 makes of use of channel measurements of the beam at certain key locations, where the locations of the RAN node 210 (e.g., gNB) within the defined area of interest are known and then expand on this data using the appropriate channel models to generate an entire radio map. Additionally, the implemented channel model should accurately consider the signal propagation conditions of the specific deployment environment, e.g., scattering, reflection, refraction, etc. Sources of data samples for the accurate modelling 305 include, but are not limited to, channel propagation models.

Figure 4:
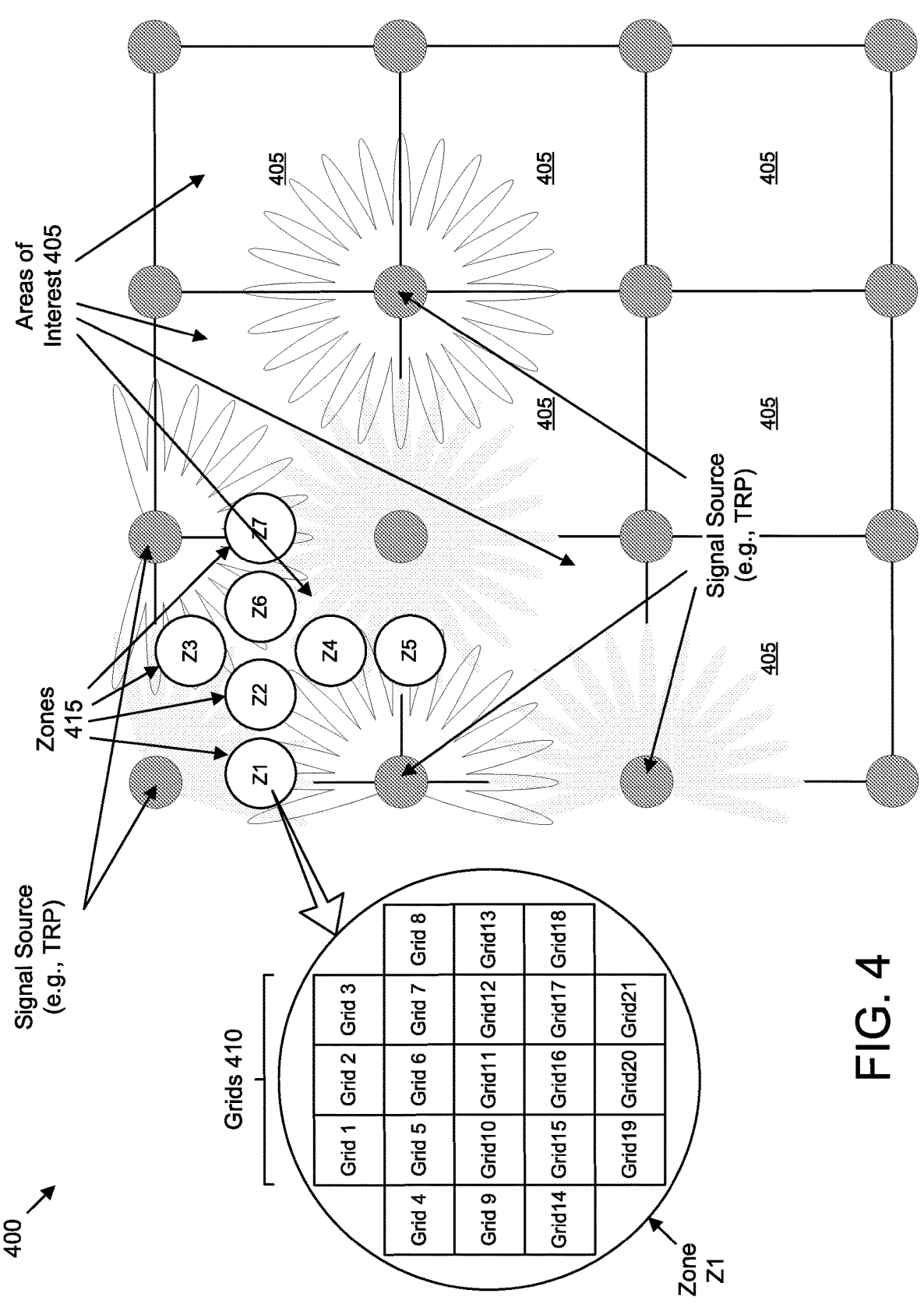
FIG. 4 is a diagram illustrating one embodiment of zone and grid partition for beam fingerprint data collection.

FIG. 4 depicts zone and grid partition 400 for BFP data collection, according to embodiments of the disclosure. In the case of point-to-point manual measurements, the area of interest 405 is uniformly partitioned into rectangular, or square, grids 410 and the BFP data samples are taken at the center of each grid 410. Each grid 410 may be associated with a Grid ID to enable dynamic location information reporting of the BFP data samples in order to update the database.

In another implementation that affects the location granularity of the BFP data samples, the grids 405 may be grouped into zones 415 (associated with a Zone ID) depending on the coverage area of the beams as depicted in FIG. 4. In the depicted embodiment, the area of interest 405 is partitioned into multiple zones 415, including a first zone (denoted "Z1"), a second zone (denoted "Z2"), a third zone (denoted "Z3"), a fourth zone (denoted "Z4"), a fifth zone (denoted "Z5"), a sixth zone (denoted "Z6"), and a seventh zone (denoted "Z7"). In the depicted embodiment, the first zone "Z1" contains a group of twenty-one grids 410, labeled from Grid 1 to Grid 21.

In another implementation, the dynamic BFP data collection and update of the database may rely on reported IMU measurements that correspond to the UE orientation and movement states, e.g., walking, sitting, automated guided vehicle (AGV) moving with constant speed or AGV changing heights to collect shelf items. Each zone of the grid may contain multiple UE Orientation IDs, where the received beam strength is measured and associated with a fixed number of UE orientations for each zone.

In an alternate implementation, a BFP data specific MDT may be triggered to operate in two states: 1) Logged BFP specific MDT—the gNB may configure the UE via RRC to measure BFP metrics/parameters for candidate TRPs to update the BFP database for logging during a certain time interval. The UE may then report and update the corresponding entries in the BFP database together with the reported location at which beam measurements were performed after the expiry of the time interval. 2) Immediate BFP specific MDT—the gNB may configure the UE via RRC to measure FP parameters for candidate TRPs for immediate reporting to update the relevant entries of the FP database.

Regarding RF BFP database generation, the basic BFP database parameters are shown in Table 1.

TABLE 1

| BFP Database | |
| --- | --- |
| Location | Beam Fingerprint |
| Location 1 | BFP 1 |
| Location 2 | BFP 2 |
| Location 3 | BFP 3 |
| . | . |
| . | . |
| . | . |
| Location N-2 | BFP N-2 |
| Location N-1 | BFP N-1 |
| Location N | BFP N |

An ID may correspond to a locally (specific to a single gNB) or globally (among a set of gNBs) defined Beam/TRP ID associated to a BFP, depending on the implementation. The UE location information shown in Table 1 may include one or more the following:

Zone ID

Grid ID 2D (x,y) coordinates of the UE 3D (x,y,z) coordinates of the UE

UE Speed

UE Velocity

UE Orientation

UE Heading

Height

Antenna array location information

The BFP parameters shown in Table 11, which can be measured by the UE include:

BFP Type 1 Measurements: are based on L1 (Layer 1) DL beam measurements which is a linear average of the L1 measurement at each antenna port, such as CSI-RSRP, SS-RSRP and/or SS-RSRQ.

BFP Type 2 Measurements: are based on L3 (Layer 3) DL beam measurement by filtering L1 measurements.

The BFP measurements can be characterized by receiver signal strength ("RSS"), angle-of-departure ("AoD") and/or angle-of-arrival ("AoA") measurements, timing-based measurements, power delay profile measurements, in addition to any QCL assumptions associated to the beams. The BFP measurements can also be based on uplink beam measurements such as Sounding Reference Signal ("SRS").

Two types of Reference Signal ("RS") configuration may be provided in the context of the BFP. In one embodiment, a single RS configuration is provided requiring only a change in the spatial filter based on the UE's location. In another embodiment, different RS configurations are provided based on UE's location associated to a BFP point. In an alternate implementation, the measured and reported RS values (e.g., Reference Signal Received Power ("RSRP"), Reference Signal Received Quality ("RSRQ")) may also include the corresponding UE location information of the measurement.

Regarding multi-level RF beam fingerprinting database, a UE is configured with a multi-level RF beam fingerprint database for some or all of the location points, where multi-level RF beam fingerprint database contains one set of the best beams mapping for that coordinate in horizontal plane, second set of the best beams mapping for that coordinate in vertical plane and a combination of these beams in horizontal and vertical place for different orientations for a given coordinate. An exhaustive table for all planes and orientations is illustrated in Table 2. It should be noted that smaller sub-sets of such tables are also possible to be configured such as only one plane for different orientations, two planes for single orientation, one place for one orientation.

TABLE 2

BFP Database in different planes and orientation

| Location | Plane | Orientation | Beam Fingerprint in Vertical Plane |
|---|---|---|---|
| Location 1 | Horizontal | O1 | BFP 1 |
| | | O2 | BFP 2 |
| | Vertical | O1 | BFP 3 |
| | | O2 | BFP4 |
| Location 2 | Horizontal | O1 | BFP 5 |
| | | O2 | BFP 6 |
| | Vertical | O1 | BFP 7 |
| | | O2 | BFP8 |
| . . . | . . . | . . . | . . . |

A second solution is disclosed herein which relates to Beam Training with a BFP database. Here, it is assumed that the BFP database has already been setup as described above in the first solution. The second solution describes the procedures for exploiting BFP database to optimize beam-based transmissions towards a UE/group of UEs.

Figure 5:
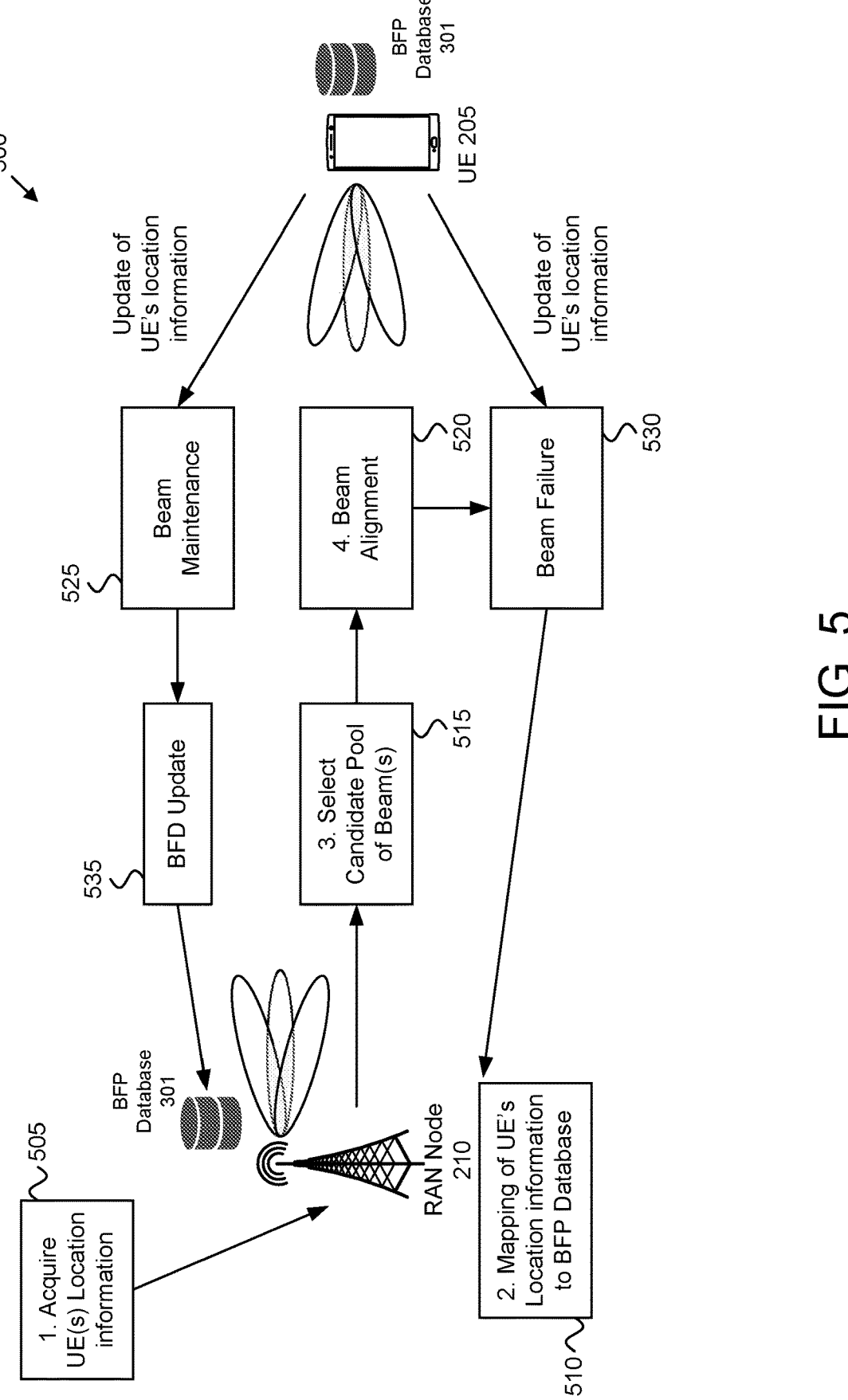
FIG. 5 is a diagram illustrating one embodiment of beam-management procedures using a beam fingerprint database.

FIG. 5 depicts the overall set 500 of beam management procedures that rely on the BFP database. The depicted procedures involve at least a RAN node 210 and a UE 205. The procedure for optimizing beam-based transmissions using a BFP database 301 includes, at step 1, acquiring UE location information for a UE, or group of UEs (see block 505) and, at step 2, mapping the UE location information to the BFP database 301 (see block 510). Note that the RAN node 210 may store a local copy of the BFP database 301. The procedure for optimizing beam-based transmissions using a BFP database 301 also includes, at step 3, selecting a candidate pool or one or more beams (see block 515) and, at step 4, performing beam alignment (also referred to as beam correspondence) of the selected Tx beam (see block 520).

Other beam management procedures which can be improved/optimized using the BFP database include beam maintenance (see block 525) and beam failure (see block 530). During the beam management procedures, the UE 205 and/or RAN node 210 may update the BFP database (see block 535).

Regarding location information acquisition, the gNB (e.g., the RAN node 210) may request the UE location information for mapping to the BFP database in one of the following ways:

Using MAC CE/RRC signaling based on the location information request and reporting message. The UE reports its location, for example using Global Navigation Satellite System ("GNSS") information, or IMU sensors, or with the help of RAT-dependent positioning methods.

The gNB may act as a Location Services ("LCS") client and request the UE's location information from a CN entity, such as the LMF, using the request and report messaging along the NRPPa interface.

Furthermore, such location reporting may be based on aperiodic, periodic or semi-persistent signaling and may be signaled via RRC, or LPP, and/or MAC-CE signaling. A UE 205 may also determine and report its current zone and/or grid for updating its location information depending on the number of TRPs serving a particular zone or grid. In another implementation, the group location information of multiple close proximity UEs may be reported to the gNB.

In another implementation, the UE is configured with UL configured grant ("CG") resources to report any change in its location/orientation information. The location/orientation change that triggers the updated report depends on the speed and beams' granularity/width. If the gNB does not receive an update, it assumes that the UE is static and uses the last reported location/orientation information for beam selection of the next transmission.

Regarding beam selection and beam correspondence, upon reception of the UE's location information, the gNB may map the location with the matching BFP data point corresponding to the Tx beam signal characteristics that best suit beam transmission at that specific UE location during a time interval. In another embodiment, the gNB may map the location information to two or more BFP data points and create a group/pool of TRP candidates with respect to a given location, e.g., zone or grid. If there are more than one TRP that can serve the UE (based on the UE location/ orientation associated with one or more BFP points), gNB may decide the best transmission scheme to serve the UE, such as beam diversity, spatial/beam multiplexing, etc. with the proper power/weight scaling for each beam depending on the distance to the TRP and/or the expected beam strength or width of each TRP's beam.

From the network perspective the, the gNB can optimally select and switch the Tx beams for multiple static/dynamic UEs based on the BFP signatures while reducing measurement signaling overhead. The BFP database may also include spatial information related to AoD enabling the gNB to adjust the elevation and coverage of the beam for a UE/set of UEs.

The UE can also align its Rx beam based on the information contained within a local version of the BFP database, which takes into account the UE orientation and height in order to align with the best candidate Tx beam at a given time in a specific location. The gNB may also provide the UE with a list of candidate Tx beams available in order to determine a suitable beam pair by mapping the BFP characteristics in the locally stored database. In another implementation, the UE may request such candidate Tx beam lists or BFP-related beam information.

Regarding beam maintenance and beam failure, in order to update the BFP database based on dynamic channel and mobility conditions such as blockages, movement patterns, the UE would have to be configured to measure the BFP metrics within specified time intervals, which may be based on a timer, measurement report periodicity, or on-demand signaling and signaled via Downlink Control Information ("DCI"), MAC CE, and/or RRC signaling. In one implementation, UE reports its signal strength measurements, e.g., SS-RSRP, SS-RSRQ, CSI-RSRP, CSI-RSRQ, only as soon as it falls below a certain threshold, defined by gNB. Based on the signal threshold level, gNB configures the BFP metrics parameters.

In the event of beam failure, the UE may query the locally stored BFP database to perform beam re-alignment based on a candidate set of suitable beams corresponding to its position. In another implementation, the UE may report the beam-failure along with location information at which the beam failure occurred. The gNB may use such information to statistically analyze the BFP data points over a period of time to infer the presence of any channel impairments such as blockages and update the BFP database.

Mobile UEs can be configured to autonomously switch its Rx beam based on the change of its location, e.g., based on its current zone/grid/orientation IDs with respect to the TRPs originating from the same serving gNB or neighboring gNBs. A centralized BFP database implementation would assist in managing the UE Rx beam switching on a global level depending on the movement pattern of the UE.

Regarding beam mapping configuration based on SSB beams, the gNB transmits each of the SSB beams and associate each of the SSB beam with a one or multiple mapping tables indicating a coarse level of mapping between the beam and the location. The exact mapping tabled from the set of tables can be used by the UE depending upon the measured RSRP for each of the SSB beam. For each of the SSB beam, gNB provides mapping of multiple tables to multiple RSRP values as it can be assumed to provide a coarse estimate of the UE's location relative to the transmitting TRP. Based on this mapping, UE can use same or different beam for the remaining transmission/reception in the initial access.

In some embodiments, when the UE is in RRC connected mode, it is expected to be configured with more finer mapping table for selecting beam(s) depending upon the finer location coordinate.

Regarding dynamic overriding and/or dynamic update of a set of beams corresponding to location, when a UE has been configured with RF beam mapping to autonomously adopt beams depending upon its location, and if additionally it receives a dynamic indication for beam (Transmission Configuration Indicator ("TCI") state with QCL-type D) to be used for the following transmission/reception for a fixed duration or indefinite duration, then the UE is expected to override the configured mapping for the given location and apply the dynamically adopted beam indicated via DCI and/or MAC CE. If no time duration for the applicability of dynamically indicated beam(s) is given, then the UE can assume to replace the beam for corresponding location and continue to apply this beam for that location until it received a new mapping or indication to change beam. In some embodiments, when a UE is configured with multiple beams for a given location via the mapping table, then the UE be dynamically indicated with an invalid beam (potentially because of a blockage predicted/identified on that beam) and the UE is not expected to use that invalid beam and rather apply one of the other beams that has been configured by a mapping table.

Figure 6:
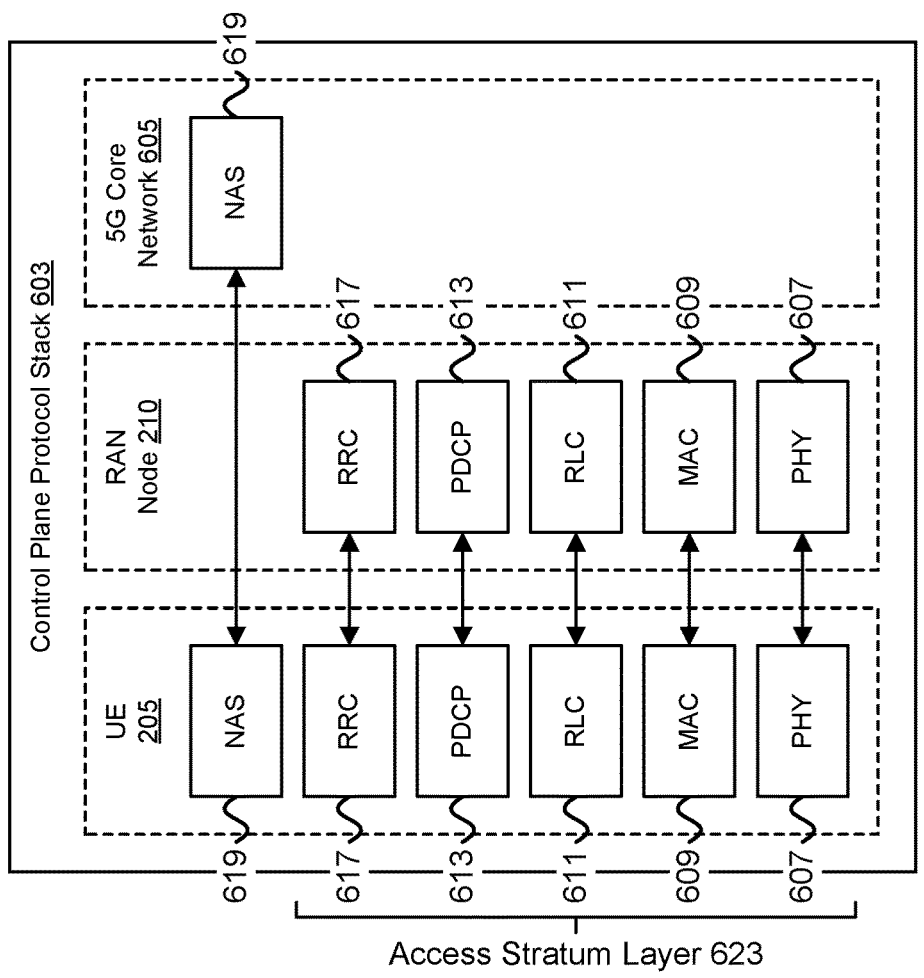
FIG. 6 is a block diagram illustrating one embodiment of a NR protocol stack of a UE.
Figure 6:
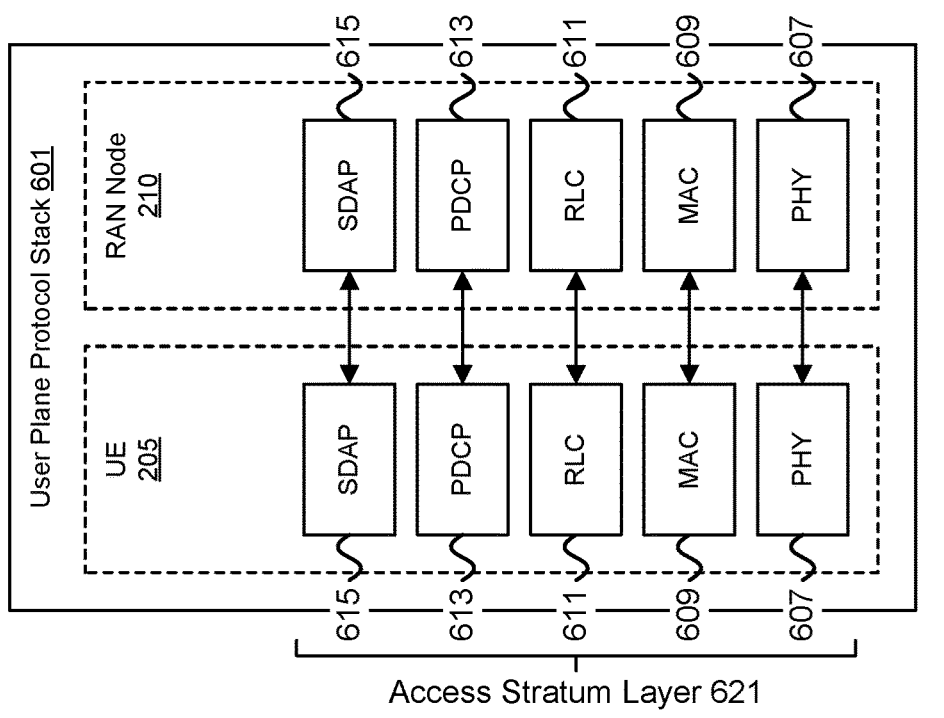

FIG. 6 depicts a protocol stack 600, according to embodiments of the disclosure. While FIG. 6 shows the UE 205, the RAN node 210 and a 5G core network 605, these are representative of a set of remote units 105 interacting with a base unit 121 (or gNB) and a mobile core network 140. As depicted, the protocol stack 600 comprises a User Plane protocol stack 601 and a Control Plane protocol stack 603. The User Plane protocol stack 601 includes a physical ("PHY") layer 607, a Medium Access Control ("MAC") sublayer 609, the Radio Link Control ("RLC") sublayer 611, a Packet Data Convergence Protocol ("PDCP") sublayer 613, and Service Data Adaptation Protocol ("SDAP") layer 615. The Control Plane protocol stack 603 includes a physical layer 607, a MAC sublayer 609, a RLC sublayer 611, and a PDCP sublayer 613. The Control Place protocol stack 603 also includes a Radio Resource Control ("RRC") layer 617 and a Non-Access Stratum ("NAS") layer 619.

The Access Stratum ("AS") layer 621 (also referred to as "AS protocol stack") for the User Plane protocol stack 601 consists of at least SDAP, PDCP, RLC and MAC sublayers, and the physical layer. The AS layer 623 for the Control Plane protocol stack 603 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 617 and the NAS layer 619 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 607 offers transport channels to the MAC sublayer 609. The MAC sublayer 609 offers logical channels to the RLC sublayer 611. The RLC sublayer 611 offers RLC channels to the PDCP sublayer 613. The PDCP sublayer 613 offers radio bearers to the SDAP sublayer 615 and/or RRC layer 617. The SDAP sublayer 615 offers QoS flows to the core network (e.g., 5GC 605). The RRC layer 617 provides for the addition, modification, and release of Carrier Aggregation and/or Dual Connectivity. The RRC layer 617 also manages the establishment, configuration, maintenance, and release of Signaling Radio Bearers ("SRBs") and Data Radio Bearers ("DRBs").

Regarding beam management in NR, beam management is defined as a set of Layer 1/2 procedures (i.e., involving PHY layer 607 and MAC layer 609) to acquire and maintain a set of beam pair links, i.e., a beam used at transmit/receive point(s) ("TRP(s)") for RAN-side paired with a beam used at the UE. The beam pair links can be used for downlink ("DL") and uplink ("UL") transmission/reception. The beam management procedures include at least the following six aspects:

Beam sweeping operation of covering a spatial area, with beams transmitted and/or received during a time interval in a predetermined way.

Beam measurement: for the TRP(s) or the UE to measure characteristics of received beamformed ("BF") signals Beam reporting: for the UE to report information of BF signal(s) based on beam measurement Beam determination: for the TRP(s) or the UE to select of its own Tx/Rx beam(s)

Beam maintenance: for the TRP(s) or the UE to maintain the candidate beams by beam tracking or refinement to adapt to the channel changes due to the UE movement or blockage.

Beam recovery: for the UE to identify new candidate beam(s) after detecting beam failure and subsequently inform the TRP of beam recovery request with information of indicating the new candidate beam(s)

Regarding UL beam-management in NR, according to 3GPP Technical Specification ("TS") 38.214, two transmission schemes, codebook-based transmissions and non-codebook based transmissions, are supported for PUSCH. For PUSCH transmission(s) dynamically scheduled by an UL grant in a DCI, a UE shall upon detection of a PDCCH with a configured DCI format 0_0 or 0_1 transmit the corresponding PUSCH as indicated by that DCI.

Regarding QCL assumptions, according to current specification, there is only one QCL type, i.e., 'qcl-typeD' for spatial relation between the source RS and target RS. This means that only a single source to single target beam association can be established. However, as we go higher in frequency, the number of beams could become a lot higher, therefore, more coarse association could be considered to cover wider areas. Also, from TCI indication point of view, there was enhancement in Rel. 16 to indicate up to two TCI states corresponding to two TRPs. However, this is still quite limited when there could be possibly higher number of TRPs for Frequency Range #2 ("FR2", i.e., frequencies from 24.25 GHz to 52.6 GHz) and beyond. According to section 5.1.5 of 3GPP TS 38.214 (v16.0.0), following is specified in terms of QCL assumptions:

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-co-location ("QCL") relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

The UE receives an activation command used to map up to 8 TCI states to the codepoints of the DCI field 'Transmission Configuration Indication' in one Component Carrier and/or Downlink Bandwidth Part ("CC/DL BWP") or in a set of CCs/DL BWPs, respectively. When a set of TCI state IDs are activated for a set of CCs/DL BWPs, where the applicable list of Component Carriers ("CCs") is determined by indicated CC in the activation command, the same set of TCI state IDs are applied for all DL BWPs in the indicated CCs.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location.

The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability.

For a periodic CSI-RS resource in a non-zero power CSI-RS resource set ("NZP-CSI-RS-ResourceSet") configured with higher layer parameter trs-Info, the UE shall expect that a TCI-State indicates one of the following quasi co-location type(s):

'QCL-TypeC' with an SS/PBCH block and, when applicable, 'QCL-TypeD' with the same SS/PBCH block, or 'QCL-TypeC' with an SS/PBCH block and, when applicable, 'QCL-TypeD' with a CSI-RS resource in an NZP-CSI-RS-ResourceSet configured with higher layer parameter repetition For an aperiodic CSI-RS resource in an NZP-CSI-RS-ResourceSet configured with higher layer parameter trs-Info, the UE shall expect that a TCI-State indicates QCL-TypeA' with a periodic CSI-RS resource in an NZP-CSI-RS-ResourceSet configured with higher layer parameter trs-Info and, when applicable, 'QCL-TypeD' with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s):

'QCL-TypeA' with a CSI-RS resource in an NZP-CSI-RS-ResourceSet configured with higher layer parameter trs-Info and, when applicable, 'QCL-TypeD' with the same CSI-RS resource, or 'QCL-TypeA' with a CSI-RS resource in an NZP-CSI-RS-ResourceSet configured with higher layer parameter trs-Info and, when applicable, 'QCL-TypeD' with an SS/PBCH block, or 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeB' with a CSI-RS resource in an NZP-CSI-RS-ResourceSet configured with higher layer parameter trs-Info when 'QCL-TypeD' is not applicable.

For a CSI-RS resource in an NZP-CSI-RS-ResourceSet configured with higher layer parameter repetition, the UE shall expect that a TCI-State indicates one of the following quasi co-location type(s):

'QCL-TypeA' with a CSI-RS resource in an NZP-CSI-RS-ResourceSet configured with higher layer parameter trs-Info and, when applicable, 'QCL-TypeD' with the same CSI-RS resource, or 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeC' with an SS/PBCH block and, when applicable, 'QCL-TypeD' with the same SS/PBCH block.

For the DM-RS of PDCCH, the UE shall expect that a TCI-State indicates one of the following quasi co-location type(s):

'QCL-TypeA' with a CSI-RS resource in an NZP-CSI-RS-ResourceSet configured with higher layer parameter trs-Info and, when applicable, 'QCL-TypeD' with the same CSI-RS resource, or 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in an NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE shall expect that a TCI-State indicates one of the following quasi co-location type(s):

'QCL-TypeA' with a CSI-RS resource in an NZP-CSI-RS-ResourceSet configured with higher layer parameter trs-Info and, when applicable, 'QCL-TypeD' with the same CSI-RS resource, or 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in an NZP-CSI-RS-ResourceSet configured without higher layer parameter trs-Info and without higher layer parameter repetition and, when applicable, 'QCL-TypeD' with the same CSI-RS resource.

Regarding beam-management in NR release 17 ("Rel-17"), it is agreed to support Further enhanced Multiple-Input and Multiple-Output ("FeMIMO") on the unified TCI framework. It is agreed to support joint TCI for DL and UL based on and analogous to Rel-15/16 DL TCI framework. The term "TCI" at least comprises a TCI state that includes at least one source RS to provide a reference (UE assumption) for determining QCL and/or spatial filter. The source reference signal(s) in M TCIs provide common QCL information at least for UE-dedicated reception on PDSCH and all or subset of Control Resource Sets ("CORESETs") in a CC.

Optionally, this common QCL information can also apply to CSI-RS resource for CSI, CSI-RS resource for Beam Management ("BM"), and CSI-RS for tracking. In one embodiment, applicability on PDSCH includes PDSCH default beam. It is assumed to select between M=1 and M>=1.

The source reference signal(s) in N TCIs provide a reference for determining common UL Tx spatial filter(s) at least for dynamic-grant/configured-grant based PUSCH, all or subset of dedicated PUCCH resources in a CC. Optionally, this UL Tx spatial filter can also apply to all SRS resources in resource set(s) configured for antenna switching/codebook-based/non-codebook-based UL transmissions. In one embodiment, applicability of this UL Tx spatial filter to SRS configured for beam management (BM). In another embodiment, PUSCH port determination is based on the TCI, e.g., to be mapped with SRS ports analogous to Rel-15/16. It is assumed to select between N=1 and N>=1.

In one embodiment, an extension to common QCL information applied to only some of the CORESETs or PUCCH resources in a CC, e.g., for multiple TRPs ("mTRP"). In another embodiment, when used for the purpose of joint beam indication for UL and DL, whether a joint TCI pool for DL and UL dedicated for the purpose is used, or the same TCI pool as that used for the purpose of separate DL/UL beam indication is used. Note that the resulting beam indication directly refers to the associated source RS(s).

Figure 7:
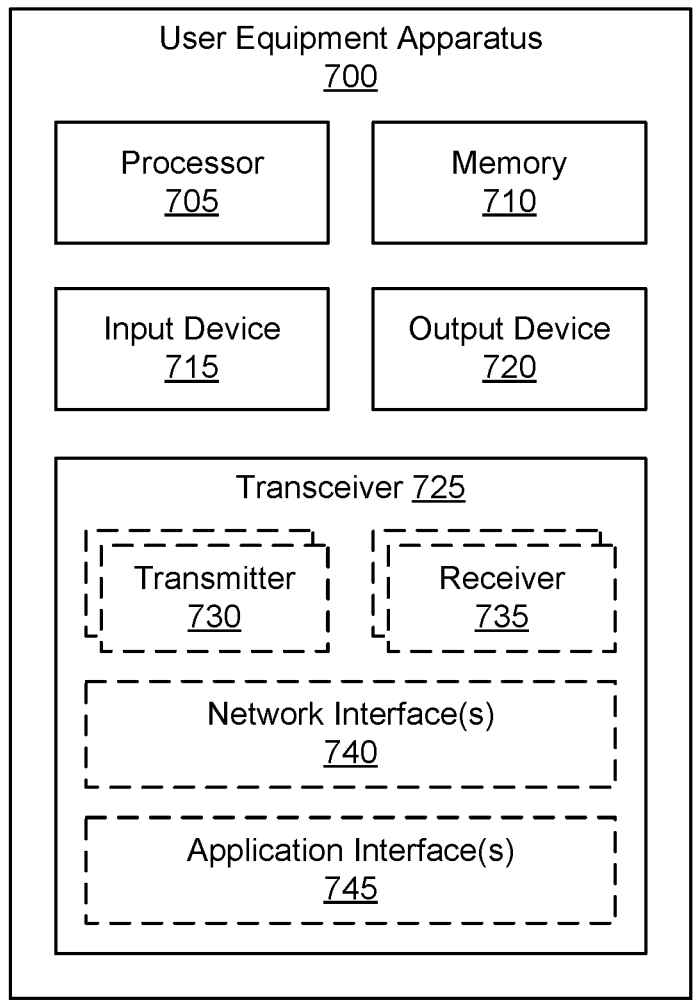
FIG. 7 is a diagram illustrating one embodiment of a user equipment apparatus that may be used for location-aware beam selection.

FIG. 7 depicts a user equipment apparatus 700 that may be used for location-aware beam selection, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 maps a set of (i.e., one or more) beam signal characteristics to UE location information and stores said mapping to a BFP database. The processor 705 identifies a UE location and selects an optimal beam based using the UE location and the BFP database, said optimal beam being one of: a transmit beam ("Tx beam") and a receive beam ("Rx beam"). In further embodiments, the processor 705 controls the transceiver 725 to communicate with a RAN node (i.e., via a radio interface) using the selected optimal beam (i.e., transmitting an uplink signal to the RAN node or receiving a downlink signal from the RAN node).

In some embodiments, the set of beam signal characteristics includes at least one characteristic from the following: an RSS measurement (e.g., SS-RSRP, SS-RSRQ, CSI-RSRP, CSI-RSRQ), an AoD measurement, and AoA measurement, a timing-based measurement, a power delay profile measurement, or combinations thereof. In some embodiments, storing the mapping to the BFP database includes associating the UE location with the set of beam signal characteristics and with a QCL assumptions associated to each beam measured at the UE location.

In some embodiments, the BFP database includes a centralized BFP database that is managed in a core network entity and a local BFP database stored in the UE. In such embodiments, selecting the optimal beam includes searching the local BFP database using the UE location.

In some embodiments, the UE location information includes at least one from the following: a set of 2D coordinates (e.g., (x,y)), a set of 3D coordinates (e.g., (x,y,z)), a Zone ID, a Grid ID, a UE speed, a UE velocity, a height (i.e., altitude), a UE orientation, a UE heading, a set of (i.e., one or more) antenna array locations, or combinations thereof. Note that a zone may contain multiple UE orientation IDs. In one embodiment, the 2D coordinates and/or 3D coordinates are determined using GNSS positioning. In another embodiment, the 2D coordinates and/or 3D coordinates are determined using IMU measurements.

In some embodiments, the processor 705 receives a BFP configuration from a RAN node and performs beam measurements for at least one beam according to the BFP configuration. Additionally, the processor 705 updates the BFP database with the performed beam measurements and a current location of the UE, said update occurring according to a configured basis. In one embodiment, the processor 705 receives a configuration for updating the BFP with logged beam reporting. In another embodiment, the processor 705 receives a configuration for updating the BFP with immediate beam reporting.

In some embodiments, the processor 705 detects a detecting a beam failure event and reports a beam failure indication and location information to the RAN. The processor 705 further performs a beam failure recovery action in response to the beam failure indication, said beam failure recovery action including at least one action from following: beam re-selection based on the current location or beam re-alignment based on the current location.

In some embodiments, the processor 705 further performs a beam maintenance procedure, said beam maintenance procedure including reporting BFP measurement metrics (i.e., beam signal characteristics) and location information to the RAN.

In some embodiments, the processor 705 is configured with a multi-level RF BFP for at least one location point, the multi-level RF BFP including: a set of optimal beams mapping a location point in a horizontal plane, a set of optimal beams mapping a location point in a vertical plane, or combination thereof.

In some embodiments, the processor 705 is configured to measure the beam signal characteristics (i.e., BFP metrics) within configured time intervals and to update the BFP database in response to a trigger condition selected from the group including: expiry of a configured timer, a measurement report periodicity, on-demand signaling, or combinations thereof. In such embodiments, the configuration and/or the trigger condition may be signaled via one of: DCI signaling, MAC-CE, and/or RRC signaling.

In some embodiments, the processor 705 receives a dynamic indication for a beam (i.e., TCI state with QCL-type D) to be used for a subsequent transmission/reception for a future duration (i.e., fixed duration or indefinite duration), where the dynamic indication overrides a configured BFP mapping for a given location.

In some embodiments, the UE location is reported to the communication network in aperiodic, semi-persistent or periodic manner using RRC, MAC CE, and/or LPP signaling.

In some embodiments, the processor 705 further maps the UE location with a matching BFP data point corresponding to the beam signal characteristics that optimally suit beam transmission at the UE location during a defined time interval.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to location-aware beam selection and/or mobile operation. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
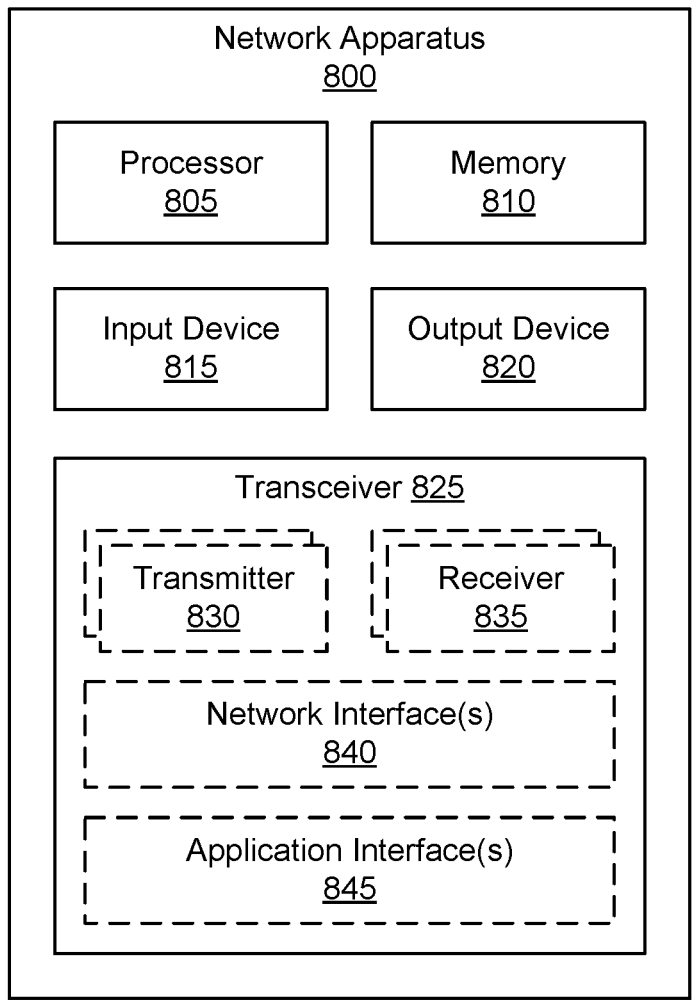
FIG. 8 is a diagram illustrating one embodiment of a network equipment apparatus that may be used for location-aware beam selection.

FIG. 8 depicts a network apparatus 800 that may be used for location-aware beam selection, according to embodiments of the disclosure. In one embodiment, network apparatus 800 may be one implementation of a RAN entity, such as the base unit 121 and/or the RAN node 210, as described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, the processor 805 maps a set of (i.e., one or more) beam signal characteristics to UE location information and stores said mapping to a BFP database. The processor 805 identifies a UE location and selects an optimal beam based using the UE location and the BFP database, said optimal beam being one of: a transmit beam and a receive beam. In further embodiments, the processor 805 controls the transceiver 825 to communicate with a UE using the selected optimal beam (i.e., transmitting a downlink signal to the UE or receiving an uplink signal from the UE).

In some embodiments, the set of beam signal characteristics includes at least one characteristic from the following: an RSS measurement (e.g., SS-RSRP, SS-RSRQ, CSI-RSRP, CSI-RSRQ), an AoD measurement, and AoA measurement, a timing-based measurement, a power delay profile measurement, or combinations thereof. In some embodiments, storing the mapping to the BFP database includes associating the UE location with the set of beam signal characteristics and with a QCL assumptions associated to each beam measured at the UE location.

In some embodiments, the BFP database includes a centralized BFP database that is managed in a core network entity and a local BFP database stored in the RAN entity, wherein selecting the optimal beam includes searching the local BFP database using the UE location.

In some embodiments, the UE location includes at least one from the following: a set of 2D coordinates (e.g., (x,y)), a set of 3D coordinates (e.g., (x,y,z)), a Zone ID, a Grid ID, a UE speed, a UE velocity, a height (i.e., altitude), a UE orientation, a UE heading, a set of (i.e., one or more) antenna array locations, or combinations thereof. Note that a zone may contain multiple UE orientation IDs. In some embodiments, identifying the UE location includes initiating a UE location acquisition procedure. In certain embodiments, the RAN entity acts as an LCS client.

In some embodiments, the processor 805 receives a beam failure indication from a UE and receives a current location of the UE. In such embodiments, the processor 805 further performs a beam failure recovery action in response to the beam failure indication, said beam failure recovery action including at least one action from the following: beam re-selection based on the current location or beam re-alignment based on the current location. In one embodiment, the message containing the beam failure indication may also contain the UE location.

In some embodiments, the processor 805 configures a UE with a BFP configuration, where the BFP configuration indicates a type of beam measurement to take and a periodicity for beam measurements. In certain embodiments, the BFP configuration further indicates a basis for updating the BFP with the performed beam measurements and a current location of the UE. In one embodiment, the basis for updating the BFP is a logged beam reporting basis. In another embodiment, the basis for updating the BFP is an immediate beam reporting basis.

In some embodiments, the processor 805 configures a UE with a multi-level RF BFP for at least one location point, the multi-level RF BFP including: a set of optimal beams mapping a location point in a horizontal plane, a set of optimal beams mapping a location point in a vertical plane, or combination thereof.

In some embodiments, the processor 805 configures a UE to measure the beam signal characteristics (i.e., BFP metrics) within configured time intervals, where the configuration indicates a trigger condition for updating the BFP database, said trigger condition selected from the group including: expiry of a configured timer, a measurement report periodicity, on-demand signaling, or combinations thereof. In certain embodiments, the configuration and/or the trigger condition is signaled to the UE via one of: DCI signaling, MAC-CE, and/or RRC signaling.

In some embodiments, the processor 805 associates each of a plurality of SSB beams with at least one mapping table indicating a coarse level of mapping between the SSB beam and the UE location. In certain embodiments, the processor 805 controls the transceiver 825 to transmit the plurality of SSB beams.

In some embodiments, the processor 805 transmits a dynamic indication for a beam (i.e., TCI state with QCL-type D) to be used for a subsequent transmission/reception for a future duration (i.e., fixed duration or indefinite duration), wherein the dynamic indication overrides a configured BFP mapping for a given location.

In some embodiments, the UE location is reported to the communication network in aperiodic, semi-persistent or periodic manner using RRC, MAC CE, and/or LPP signaling.

In some embodiments, the processor 805 maps the UE location information with a matching BFP data point corresponding to the beam signal characteristics that optimally suit beam transmission at a particular UE location during a defined time interval.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to location-aware beam selection and/or mobile operation. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the Public Land Mobile Network ("PLMN") and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
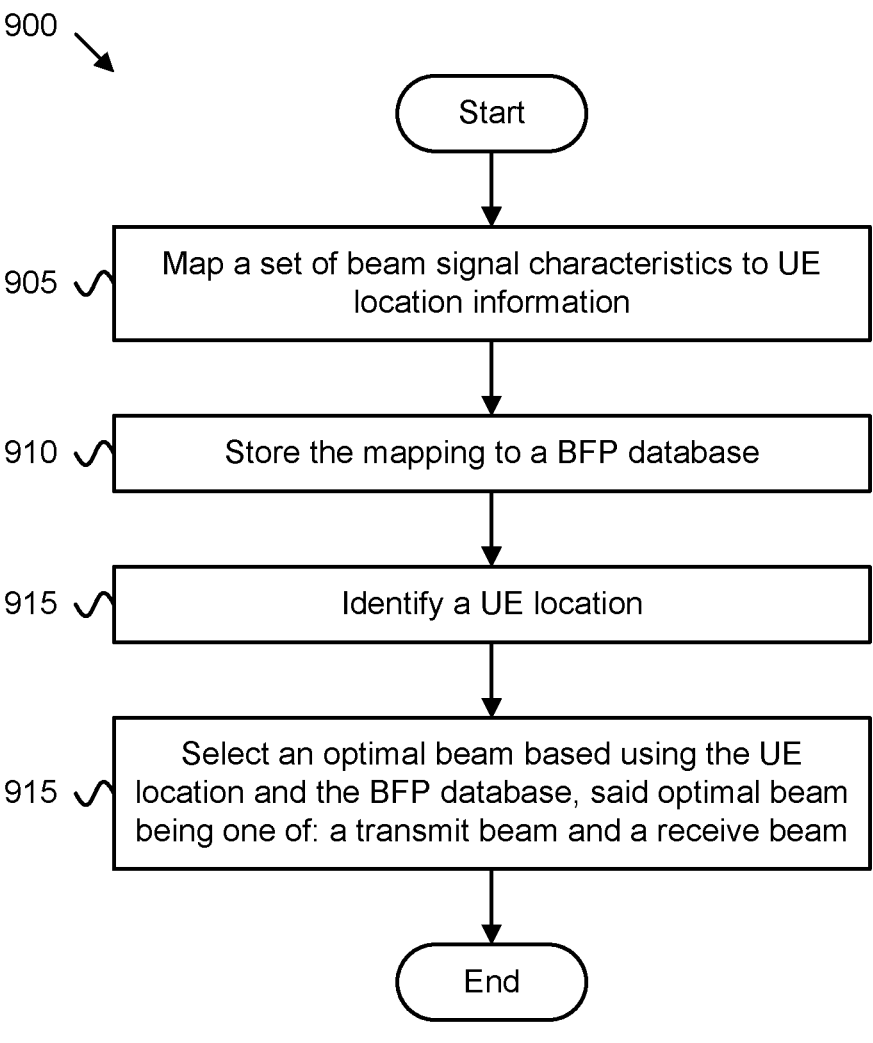
FIG. 9 is a flowchart diagram illustrating one embodiment of a method for location-aware beam selection.

FIG. 9 depicts one embodiment of a method 900 for location-aware beam selection, according to embodiments of the disclosure. In various embodiments, the method 900 is performed by a communication device, such as the remote unit 95, the base unit 121, the UE 205, the RAN node 210, the user equipment apparatus 700 and/or the network apparatus 800, described above as described above. In some embodiments, the method 900 is performed by a processor, such as a microcontroller, a microprocessor, a CPU, a GPU, an auxiliary processing unit, a FPGA, or the like.

The method 900 begins and maps 905 a set of (i.e., one or more) beam signal characteristics to UE location information. The method 900 includes storing 910 said mapping to a Beam Fingerprint ("BFP") database. The method 900 includes identifying 915 a UE location. The method 900 includes selecting 920 an optimal beam based using the UE location and the BFP database, said optimal beam being one of: a transmit beam and a receive beam. The method 900 ends.

Disclosed herein is a first apparatus for location-aware beam selection, according to embodiments of the disclosure. The first apparatus may be implemented by a UE device, such as the remote unit 105, the UE 205, and/or the user equipment apparatus 700, described above. The first apparatus includes a transceiver and a processor that maps a set of (i.e., one or more) beam signal characteristics to UE location information and stores said mapping to a BFP database. The processor identifies a UE location and selects an optimal beam based using the UE location and the BFP database, said optimal beam being one of: a transmit beam and a receive beam. In further embodiments, the processor controls the transceiver to communicate with a RAN node using the selected optimal beam (i.e., transmitting an uplink signal to the RAN node or receiving a downlink signal from the RAN node).

In some embodiments, the set of beam signal characteristics includes one or more of: an RSS measurement (e.g., SS-RSRP, SS-RSRQ, CSI-RSRP, CSI-RSRQ), an AoD measurement, and AoA measurement, a timing-based measurement, a power delay profile measurement, or combinations thereof. In some embodiments, storing the mapping to the BFP database includes associating the UE location with the set of beam signal characteristics and with a QCL assumptions associated to each beam measured at the UE location.

In some embodiments, the BFP database includes a centralized BFP database that is managed in a core network entity and a local BFP database stored in the UE. In such embodiments, selecting the optimal beam includes searching the local BFP database using the UE location.

In some embodiments, the UE location information includes one or more of: a set of 2D coordinates (e.g., (x,y)), a set of 3D coordinates (e.g., (x,y,z)), a Zone ID, a Grid ID, a UE speed, a UE velocity, a height (i.e., altitude), a UE orientation, a UE heading, a set of (i.e., one or more) antenna array locations, or combinations thereof. Note that a zone may contain multiple UE orientation IDs. In one embodiment, the 2D coordinates and/or 3D coordinates are determined using GNSS positioning. In another embodiment, the 2D coordinates and/or 3D coordinates are determined using IMU measurements.

In some embodiments, the processor receives a BFP configuration from a RAN node and performs beam measurements for at least one beam according to the BFP configuration. Additionally, the processor updates the BFP database with the performed beam measurements and a current location of the first apparatus, said update occurring according to a configured basis. In one embodiment, the processor receives a configuration for updating the BFP with logged beam reporting. In another embodiment, the processor receives a configuration for updating the BFP with immediate beam reporting.

In some embodiments, the processor detects a detecting a beam failure event and reports a beam failure indication and location information to the RAN. The processor further performs a beam failure recovery action in response to the beam failure indication, said beam failure recovery action including beam re-selection based on the current location and/or beam re-alignment based on the current location.

In some embodiments, the processor further performs a beam maintenance procedure, said beam maintenance procedure including reporting BFP measurement metrics (i.e., beam signal characteristics) and location information to the RAN.

In some embodiments, the processor is configured with a multi-level RF BFD BFP for at least one location point, the multi-level RF BFP including: a set of optimal beams mapping a location point in a horizontal plane, a set of optimal beams mapping a location point in a vertical plane, or combination thereof.

In some embodiments, the processor is configured to measure the beam signal characteristics (i.e., BFP metrics) within configured time intervals and to update the BFP database in response to a trigger condition selected from the group including: expiry of a configured timer, a measurement report periodicity, on-demand signaling, or combinations thereof. In such embodiments, the configuration and/or the trigger condition may be signaled via one of: DCI signaling, MAC-CE, and/or RRC signaling.

In some embodiments, the processor receives a dynamic indication for a beam (i.e., TCI state with QCL-type D) to be used for a subsequent transmission/reception for a future duration (i.e., fixed duration or indefinite duration), where the dynamic indication overrides a configured BFP mapping for a given location.

In some embodiments, the UE location is reported to the communication network in aperiodic, semi-persistent or periodic manner using RRC, MAC CE, and/or LPP signaling.

In some embodiments, the processor further maps the UE location with a matching BFP data point corresponding to the beam signal characteristics that optimally suit beam transmission at the UE location during a defined time interval.

Disclosed herein is a second apparatus for location-aware beam selection, according to embodiments of the disclosure. The second apparatus may be implemented by a RAN entity, such as the base unit 121, the RAN node 210, and/or the network apparatus 800, described above. The second apparatus includes a transceiver and a processor that maps a set of (i.e., one or more) beam signal characteristics to UE location information and stores said mapping to a BFP database. The processor identifies a UE location and selects an optimal beam based using the UE location and the BFP database, said optimal beam being one of: a transmit beam and a receive beam. In further embodiments, the processor controls the transceiver to communicate with a UE using the selected optimal beam (i.e., transmitting a downlink signal to the UE or receiving an uplink signal from the UE).

In some embodiments, the set of beam signal characteristics includes one or more of: an RSS measurement (e.g., SS-RSRP, SS-RSRQ, CSI-RSRP, CSI-RSRQ), an AoD measurement, and AoA measurement, a timing-based measurement, a power delay profile measurement, or combinations thereof. In some embodiments, storing the mapping to the BFP database includes associating the UE location with the set of beam signal characteristics and with a QCL assumptions associated to each beam measured at the UE location.

In some embodiments, the BFP database includes a centralized BFP database that is managed in a core network entity and a local BFP database stored in the second apparatus, wherein selecting the optimal beam includes searching the local BFP database using the UE location.

In some embodiments, the UE location includes one or more of: a set of 2D coordinates (e.g., (x,y)), a set of 3D coordinates (e.g., (x,y,z)), a Zone ID, a Grid ID, a UE speed, a UE velocity, a height (i.e., altitude), a UE orientation, a UE heading, a set of (i.e., one or more) antenna array locations, or combinations thereof. Note that a zone may contain multiple UE orientation IDs. In some embodiments, identifying the UE location includes initiating a UE location acquisition procedure. In certain embodiments, the second apparatus acts as an LCS client.

In some embodiments, the processor receives a beam failure indication from a UE and receives a current location of the UE. In such embodiments, the processor further performs a beam failure recovery action in response to the beam failure indication, said beam failure recovery action including beam re-selection based on the current location and/or beam re-alignment based on the current location. In one embodiment, the message containing the beam failure indication may also contain the UE location.

In some embodiments, the processor configures a UE with a BFP configuration, where the BFP configuration indicates a type of beam measurement to take and a periodicity for beam measurements. In certain embodiments, the BFP configuration further indicates a basis for updating the BFP with the performed beam measurements and a current location of the UE. In one embodiment, the basis for updating the BFP is a logged beam reporting basis. In another embodiment, the basis for updating the BFP is an immediate beam reporting basis.

In some embodiments, the processor configures a UE with a multi-level RF BFP for at least one location point, the multi-level RF BFP including: a set of optimal beams mapping a location point in a horizontal plane, a set of optimal beams mapping a location point in a vertical plane, or combination thereof.

In some embodiments, the processor configures a UE to measure the beam signal characteristics (i.e., BFP metrics) within configured time intervals, where the configuration indicates a trigger condition for updating the BFP database, said trigger condition selected from the group including: expiry of a configured timer, a measurement report periodicity, on-demand signaling, or combinations thereof. In certain embodiments, the configuration and/or the trigger condition is signaled to the UE via one of: DCI signaling, MAC-CE, and/or RRC signaling.

In some embodiments, the processor associates each of a plurality of SSB beams with at least one mapping table indicating a coarse level of mapping between the SSB beam and the UE location. In certain embodiments, the processor controls the transceiver to transmit the plurality of SSB beams.

In some embodiments, the processor transmits a dynamic indication for a beam (i.e., TCI state with QCL-type D) to be used for a subsequent transmission/reception for a future duration (i.e., fixed duration or indefinite duration), wherein the dynamic indication overrides a configured BFP mapping for a given location.

In some embodiments, the UE location is reported to the communication network in aperiodic, semi-persistent or periodic manner using RRC, MAC CE, and/or LPP signaling.

In some embodiments, the processor maps the UE location information with a matching BFP data point corresponding to the beam signal characteristics that optimally suit beam transmission at a particular UE location during a defined time interval.

Disclosed herein is a first method for location-aware beam selection, according to embodiments of the disclosure. The first method may be performed by a communication device, such as the remote unit 105, the base unit 121, the UE 205, the RAN node 210, the user equipment apparatus 700 and/or the network apparatus 800, described above. The first method includes mapping a set of (i.e., one or more) beam signal characteristics to UE location information and storing said mapping to a BFP database. The first method includes identifying a UE location and selecting an optimal beam based using the UE location and the BFP database, said optimal beam being one of: a transmit beam and a receive beam.

In some embodiments, the set of beam signal characteristics includes one or more of: an RSS measurement (e.g., SS-RSRP, SS-RSRQ, CSI-RSRP, CSI-RSRQ), an AoD measurement, and AoA measurement, a timing-based measurement, a power delay profile measurement, or combinations thereof. In some embodiments, storing the mapping to the BFP database includes associating the UE location with the set of beam signal characteristics and with a QCL assumptions associated to each beam measured at the UE location.

In some embodiments, the BFP database includes a centralized BFP database that is managed in a core network entity and a local BFP database stored in the communication device (i.e., a UE or RAN entity). In such embodiments, selecting the optimal beam includes searching the local BFP database using the UE location.

In some embodiments, the UE location includes one or more of: a set of 2D coordinates (e.g., (x,y)), a set of 3D coordinates (e.g., (x,y,z)), a Zone ID, a Grid ID, a UE speed, a UE velocity, a height (i.e., altitude), a UE orientation, a UE heading, a set of (i.e., one or more) antenna array locations, or combinations thereof. Note that a zone may contain multiple UE orientation IDs. In one embodiment, the 2D coordinates and/or 3D coordinates are determined using GNSS positioning. In another embodiment, the 2D coordinates and/or 3D coordinates are determined using IMU measurements.

According to a first aspect of the first method, the communication device includes a UE device. In some embodiments of the first aspect, the first method includes receiving a BFP configuration from a RAN entity and performing beam measurements for at least one beam according to the BFP configuration. In such embodiments, the first method also includes updating the BFP database with the performed beam measurements and a current location of the UE device. In one embodiment, the first method further includes receiving a configuration for updating the BFP with logged beam reporting. In another embodiment, the first method further includes receiving a configuration for updating the BFP with immediate beam reporting.

In some embodiments of the first aspect, the first method includes detecting a beam failure event and reporting a beam failure indication and location information to the RAN. In such embodiments, the first method also includes performing a beam failure recovery action in response to the beam failure indication, said beam failure recovery action being including beam re-selection based on the current location and/or beam re-alignment based on the current location.

In some embodiments of the first aspect, the first method further includes performing a beam maintenance procedure, said beam maintenance procedure including reporting BFP measurement metrics and location information to the RAN.

In some embodiments of the first aspect, the first method includes receiving a dynamic indication for a beam (i.e., TCI state with QCL-type D) to be used for a subsequent transmission/reception for a future duration (i.e., fixed duration or indefinite duration), where the dynamic indication overrides a configured BFP mapping for a given location.

According to a second aspect of the first method, the communication device includes a RAN entity. In some embodiments of the second aspect, identifying the UE location includes initiating a UE location acquisition procedure. In certain embodiments, the RAN entity acts as an LCS client.

In some embodiments of the second aspect, the first method includes receiving a beam failure indication from a UE and receiving a current location of the UE. In such embodiments, the first method further includes performing a beam failure recovery action in response to the beam failure indication, said beam failure recovery action including beam re-selection based on the current location and/or beam re-alignment based on the current location. In one embodiment, the message containing the beam failure indication may also contain the UE location.

In some embodiments of the second aspect, the first method includes configuring the UE devices with a multi-level RF BFP for at least one location point, where the multi-level RF BFP includes: a set of optimal beams mapping a location point in a horizontal plane, a set of optimal beams mapping a location point in a vertical plane, or combination thereof.

In some embodiments of the second aspect, the first method includes configuring the UE device to measure the beam signal characteristics (i.e., BFP metrics) within configured time intervals and updating the BFP database in response to a trigger condition selected from the group including: expiry of a configured timer, a measurement report periodicity, on-demand signaling, or combinations thereof. In such embodiments, the configuration and/or the trigger condition is signaled via one of: DCI signaling, MAC-CE, and/or RRC signaling.

In some embodiments of the second aspect, the first method includes transmitting a plurality of SSB beams and associating each SSB beam with at least one mapping table indicating a coarse level of mapping between the SSB beam and the UE location.

In some embodiments, the UE location is reported to the communication network in aperiodic, semi-persistent or periodic manner using RRC, MAC CE, and/or LPP signaling. In some embodiments, the first method includes mapping the UE location with a matching BFP data point corresponding to the beam signal characteristics that optimally suit beam transmission at the UE location during a defined time interval.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a communication device in a communication network, the method comprising:
   mapping a set of beam signal characteristics to UE location information, the set of beam signal characteristics comprising beam measurements corresponding to a set of measured beams;
   storing the mapping to a Beam Fingerprint ("BFP") database, wherein storing the mapping to the BFP database comprises storing an association of the UE location information with the beam measurements and an association of a Quasi-Co-Location ("QCL") with each measured beam;
   receiving a UE location; and
   selecting an optimal beam based using the UE location and the BFP database, wherein the optimal beam comprises a transmit beam or a receive beam.

2. The method of claim 1, wherein the beam measurements comprise one or more of: a Receiver Signal Strength ("RSS") measurement, an Angle-of-Departure ("AoD") measurement, and Angle-of-Arrival ("AoA") measurement, a timing-based measurement, a power delay profile measurement, or combinations thereof.

3. The method of claim 1, wherein the BFP database comprises a centralized BFP database that is managed in a core network entity and a local BFP database stored in the communication device, wherein selecting the optimal beam comprises searching the local BFP database using the UE location.

4. The method of claim 1, wherein the UE location comprises at least one selected from the group of: a set of two-dimensional ("2D") coordinates, a set of three-dimensional ("3D") coordinates, a Zone identifier ("ID"), a Grid ID, a UE speed, a UE velocity, a height, a UE orientation, a UE heading, a set of antenna array locations, and combinations thereof.

5. The method of claim 1, wherein the communication device comprises a Radio Access Network ("RAN") node, wherein identifying the UE location comprises initiating a UE location acquisition procedure.

6. The method of claim 1, wherein the communication device comprises a Radio Access Network ("RAN") node, the method further comprising:

receiving a beam failure indication from a UE;

receiving a current location of the UE; and performing a beam failure recovery action in response to the beam failure indication, the beam failure recovery action comprising beam re-selection based on the current location or beam re-alignment based on the current location.

7. The method of claim 1, wherein the communication device comprises a User Equipment ("UE"), the method further comprising:

receiving a BFP configuration from a Radio Access Network ("RAN") node;

performing beam measurements for at least one beam according to the BFP configuration; and updating the BFP database with the performed beam measurements and a current location of the UE.

8. The method of claim 1, wherein the communication device comprises a User Equipment ("UE"), the method further comprising:

detecting a beam failure event; and reporting a beam failure indication and location information to a Radio Access Network ("RAN"); and performing a beam failure recovery action in response to the beam failure indication, the beam failure recovery action comprising beam re-selection based on a current location or beam re-alignment based on the current location.

9. The method of claim 1, wherein the communication device comprises a User Equipment ("UE"), the method further comprising performing a beam maintenance procedure, the beam maintenance procedure comprising reporting BFP measurement metrics and location information to a Radio Access Network ("RAN").

10. The method of claim 1, wherein the communication device comprises a User Equipment ("UE"), the method further comprising receiving a configuration with a multi-level radio frequency ("RF") BFP database for at least one location point, the multi-level RF BFP database comprising: a set of optimal beams mapping a location point in a horizontal plane, a set of optimal beams mapping a location point in a vertical plane, or combination thereof.

11. The method of claim 1, further comprising:

configuring the communication device to measure the beam signal characteristics within configured time intervals, and updating the BFP database in response to a trigger condition selected from the group comprising: expiry of a configured timer, a measurement report periodicity, on-demand signaling, or combinations thereof, wherein the configuration and/or the trigger condition is signaled via one of: DCI signaling, MAC-CE, and/or RRC signaling.

12. The method of claim 1, wherein the communication device comprises a Radio Access Network ("RAN") node, the method further comprising:

transmitting a plurality of Synchronization Signal Block ("SSB") beams; and storing an association of each SSB beam with at least one mapping table indicating a coarse level of mapping between the SSB beam and the UE location.

13. The method of claim 1, wherein the communication device comprises a User Equipment ("UE"), the method further comprising receiving a dynamic indication for a beam to be used for a subsequent transmission/reception for a future duration, wherein the dynamic indication overrides a configured BFP mapping for a given location.

14. A base station for wireless communication, comprising:

at least one memory; and at least one processor coupled with the at least one memory and configured to cause the base station to:

map a set of beam signal characteristics to UE location information, wherein the set of beam signal characteristics comprise beam measurements for a set of measured beams;

store the mapping to a Beam Fingerprint ("BFP") database, wherein storing the mapping to the BFP database comprises storing an association of a UE location with the beam measurements and an association of a Quasi-Co-Location ("QCL") assumption with each measured beam;

receive a UE location; and select an optimal beam based using the UE location and the BFP database, wherein the optimal beam comprises a transmit beam or a receive beam.

15. The base station of claim 14, wherein identifying the UE location comprises initiating a UE location acquisition procedure, and wherein the at least one processor is configured to cause the base station to:

transmit a plurality of Synchronization Signal Block ("SSB") beams; and store an association of each SSB beam with at least one mapping table indicating a coarse level of mapping between the SSB beam and the UE location.

16. The base station of claim 14, wherein the at least one processor is configured to cause the base station to:

receive a beam failure indication from a UE;

receive a current location of the UE; and perform a beam failure recovery action in response to the beam failure indication, the beam failure recovery action comprising beam re-selection based on the current location or beam re-alignment based on the current location.

17. A User Equipment ("UE") for wireless communication, comprising:

at least one memory; and at least one processor coupled with the at least one memory and configured to cause the UE to:

map a set of beam signal characteristics to UE location information, wherein the set of beam signal characteristics comprise beam measurements for a set of measured beams;

store the mapping to a Beam Fingerprint ("BFP") database, wherein storing the mapping to the BFP database comprises storing an association of a UE location with the beam measurements and an association of a Quasi-Co-Location ("QCL") assumption with each measured beam;

receive a UE location; and select an optimal beam based using the UE location and the BFP database, wherein the optimal beam comprises a transmit beam or a receive beam.

18. The UE of claim 17, wherein the at least one processor is configured to cause the UE to:

receiving a BFP configuration from a Radio Access Network ("RAN") node;

performing beam measurements for at least one beam according to the BFP configuration; and updating the BFP database with the performed beam measurements and a current location of the UE.

19. The UE of claim 17, wherein the at least one processor is configured to cause the UE to:

detect a beam failure event; and report a beam failure indication and location information to a base station; and perform a beam failure recovery action in response to the beam failure indication, the beam failure recovery action comprising beam re-selection based on a current location or beam re-alignment based on the current location.

20. The UE of claim 17, wherein the at least one processor is configured to cause the UE to perform a beam maintenance procedure, the beam maintenance procedure comprising reporting BFP measurement metrics and location information to a base station.

\*    \*    \*    \*    \*